United States Patent

[11] 3,599,987

[72] Inventor Itsuki Ban
829 Higashi-Oizumimachi, Nerima-ku,
Tokyo-to, Japan

[21] Appl. No. 732,678
[22] Filed May 28, 1968
[45] Patented Aug. 17, 1971
[32] Priority May 29, 1967
[33] Japan
[31] 42/44713

[54] SELECTOR AND REPRODUCER FOR A PLURALITY OF ENDLESS TAPE CARTRIDGES
11 Claims, 7 Drawing Figs.

[52] U.S. Cl. .................... 274/4, 179/100.2, 352/123
[51] Int. Cl. .................... B65h 19/00, G11b 15/66, G03b 21/04
[50] Field of Search .................... 242/55.19, 198—200; 274/10, 11, 4 A—E; 179/100.2, 100; 352/123

[56] References Cited
UNITED STATES PATENTS
2,781,689 2/1957 Heyer .................... 242/55.19

*Primary Examiner*—J. Russell Goudeau
*Attorney*—Nathan M. Briskin

ABSTRACT: An endless tape player comprising a housing storing therein a plurality of cartridges each receiving an endless tape therewithin, capstan means engageable and disengageable with a pinch roller stored in each cartridge for controlling a tape feed, cartridge-selecting means for controlling rotation of said housing to bring the cartridge to be reproduced into a position opposite to said capstan, an indicator for making sure of the presence of the cartridge during reproducing, whereby one of the plurality of cartridges is selectively taken out of each cartridge for tape reproduction.

INVENTOR
ITSUKI BAN

BY [signature]

ATTORNEY

INVENTOR
ITSUKI BAN

BY

ATTORNEY

SELECTOR AND REPRODUCER FOR A PLURALITY OF ENDLESS TAPE CARTRIDGES

BACKGROUND OF THE DISCLOSURE

The present invention relates to an endless tape player, more particularly to such a player for selecting one of endless tape cartridges out of them and for remote-controlling class that a plurality of cartridges are provided therewithin to select it when use. This will also be of no practical use since the player is bulky and structurally defective due to the provision of the play on the car dashboard.

SUMMARY OF THE INVENTION

The principal object of the present invention is, therefore, to provide an endless tape player comprising a main body adapted to selectively play a tape stored in each cartridge and an operating mechanism.

The present invention has another object to provide a player of such a class wherein a main body is receivable within a trunk of a car while an operating mechanism is mounted on a driver's cab.

Further object of the invention is to provide an endless tape player wherein a plurality of cartridges are stored in a rotatable housing, the housing being rotated and rotation thereof being stopped whereby a selected cartridge is caused to be engaged with a capstan arrangement provided adjacent the housing to effect tape reproduction.

Still another object of the invention is to provide an endless tape player including an indicator which is effective to select the cartridge for tape reproduction and which is adapted to make sure the presence of the cartridge in operation.

Still further object of the present invention is to provide an endless tape player performing to prevent deformation of a pinch roller due to a capstan arrangement such that it is away from a pinch roller stored in each cartridge when out of operation.

Further objects and additional advantages of the invention will become apparent from the following detail description and annexed drawings, wherein:

Figure 5:
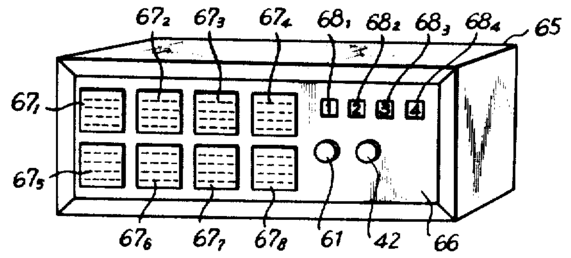
FIG. 5 is a perspective view of an apparatus for selecting the cartridge and the soundtrack, and indicating these selections.

FIGS. *6a* and *6b* are circuits for the apparatus shown in FIG. 5.

DESCRIPTION OF A SPECIFIC EMBODIMENT

Figures 1, 2:
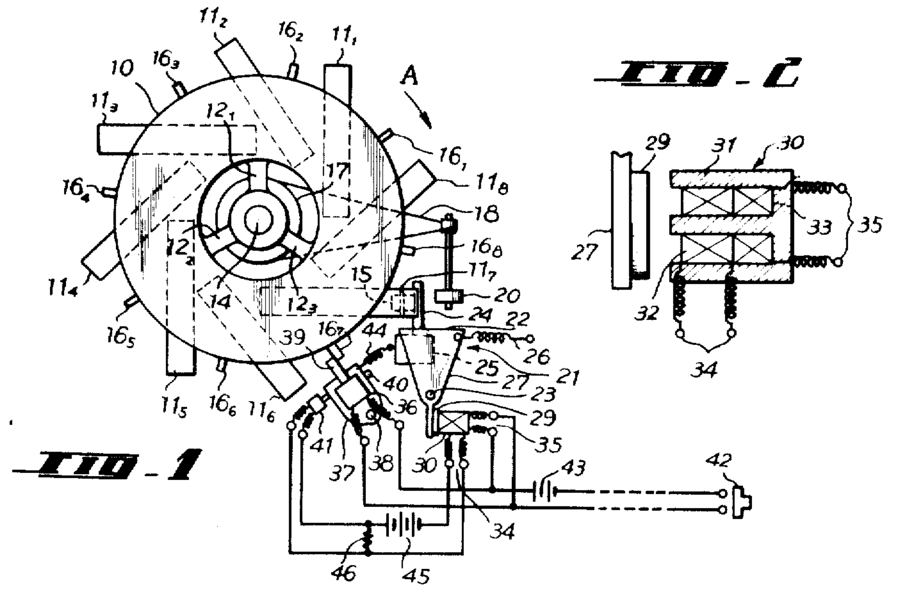
FIG. 1 is a schematic representation of a player having the invention embodied therein.
FIG. 2 is a sectional view of an electromagnetic coil for controlling rotation of a capstan arrangement.

Referring to FIG. 1, a housing or casing 10 releasably accommodates cartridges $11_1$, $11_2$, $11_3$, ..., $11_8$ holding each an endless tape, and is rotatably supported by a shaft 14 secured to the player body (not shown) through arms $12_1$, $12_2$ and $12_3$ and a sleeve 13. Each of the cartridges $11_1$, $11_2$, $11_3$, ..., $11_8$ is, when accommodated in the housing 10, positioned at an angle to the radial direction of the housing 10. The leading edge of each of the cartridges projects from the peripheral surface of the housing and is provided with a window of such size as to be sufficient to receive the capstan and the magnetic head. The cartridge may be inserted into each of the holes arranged in the housing so as to be held in position in the aforementioned manner, and may be manually taken out from this hole. Each of the cartridges $11_1$, $11_2$, $11_3$, ..., $11_8$ is provided therein with a pinch roller, as indicated by the numeral 15 in the cartridge $11_7$.

On the peripheral surface of the housing 10, there are provided projections $16_1$, $16_2$, ..., $16_8$ corresponding to the cartridges respectively, such projections being designed to engage an electromagnetic plunger to be described later to stop the movement of the housing 10. To the sleeve 13 there is arranged a belt wheel 17, and a belt 18 is passed between this belt wheel 17 and a rotating shaft 19. The rotatable shaft 19 is rotatably supported by the player body through a bearing (not shown) and is provided with a rubber wheel 20 secured to a part thereof. As described later, the rubber wheel 20, when the capstan is urged thereagainst, is driven to rotate together with the shaft 19. This rotation of the shaft 19 is transmitted through the belt 18, the belt wheel 17, the sleeve 13, and the arms $12_1$, $12_2$ and $12_3$ to the housing 10 so as to rotate it in the direction of arrow A.

Figures 3, 4:
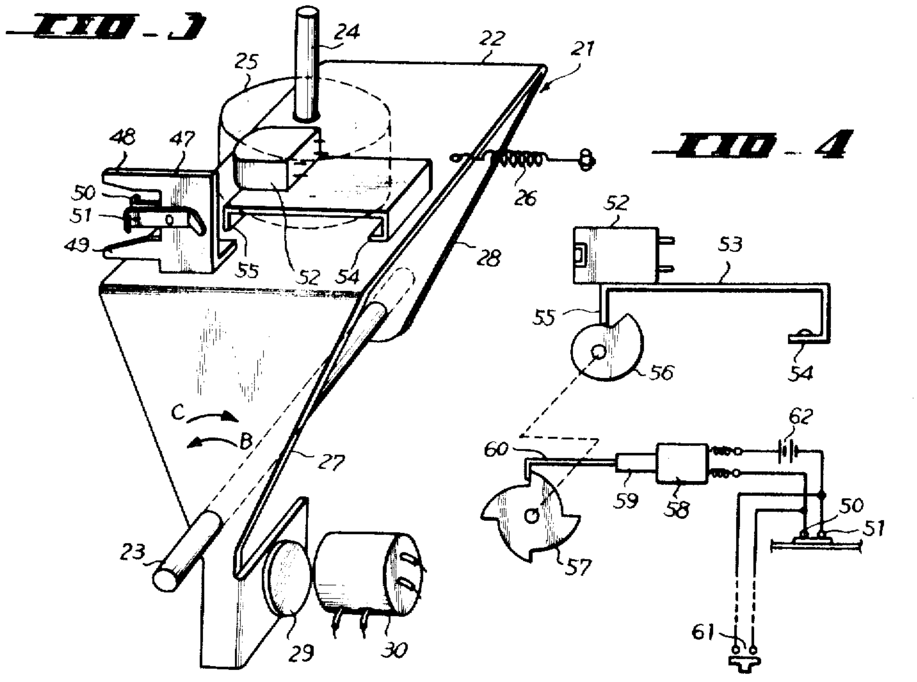
FIG. 3 is a perspective view of the capstan arrangement used in the player shown in FIG. 1.
FIG. 4 is a diagram of a soundtrack switchover mechanism.

The numeral 21 denotes a capstan arrangement of which detail is shown in FIG. 3. In FIG. 1 there are shown only a deck 22, a shaft 23 which rotatably supports said deck 22, a capstan 24 projecting from the upper surface of the deck 22 and an electronic motor 25, the rotatable shaft of which serves also as the capstan 24. The electronic motor 25 is secured to the lower side of the deck 22 and its rotatable shaft passes through the deck 22 and projects upwardly to form the capstan 24. A spring 26 extends between the deck 22 and the player body (not shown) in order to urge the capstan arrangement 21 to rotate it clockwise about the shaft 23.

The deck 22 is provided with two bent-down sideplates. One of these sideplates 27 is provided at a part thereof with a magnetic substance element 29, and in opposition thereto there is provided an attracting device 30 secured to the player body. When supplied with current, the attracting device 30 strongly attracts the element 29 so that the capstan arrangement 21 is swung against the action of the spring 26 to bring the capstan 24 into engagement with the pinch roller 15 of the oppositely positioned cartridge. FIG. 1 shows a state where the cartridge $11_7$ is selected and the capstan 24 is in engagement with the pinch roller 15 so that the tape is run and the reproduction is being effected.

In FIG. 2 there is shown the attracting device 30 in detail. Two coils 32 and 33 are held in a cylindrical yoke 31. When current is supplied to the coil 32 through terminals 34, the disc-shaped magnetic substance element 29 is strongly attracted. Once the element 29 is brought into contact with the device 30, the magnetic path is closed so that the element 29 is held in contact even if the current flowing through the coil 32 is relatively weak. Thus, the capstan 24 is held in engagement with the pinch roller 15 with very small amount of electric power being consumed by the coil 32.

When such pulse current is supplied to the coil 33 through the terminals 35 that a flux is produced which cancels the flux produced by the coil 32, the power for attracting the element 29 is lost, and then the capstan arrangement 21 is returned through the action of the spring 26 and accordingly the capstan 24 is moved off the pinch roller 15. If current supply to the coil 32 is stopped while the element 29 is held in contact, the capstan arrangement 21 is naturally returned due to nonexistence of the attracting force. Therefore, if current supply is stopped during reproduction, the element 29 is immediately released from the attracted state, and the capstan 24 is automatically moved off the pinch roller 15. Thus, there is no possibility of such grave trouble as degradation of the tone quality of the reproduction due to deformation of the pinch roller 15 or a tape entanglement due to adhesion of the endless tape to the pinch roller 15 when reproduction is resumed.

An electromagnetic plunger 36 is mounted on a support 37 rotatably supported by a shaft 38 secured to the player body. An operating member 39 extends toward the peripheral surface of the housing 10. In the swing range of the support 37 there are provided a stop pin 40 and a microswitch 41, these limiting the swing range to a certain angle. When no current is supplied to the electromagnetic plunger 36, the housing 10 is held immovable with one of the projections $16_1$, $16_2$, ..., $16_8$ in engagement with the operating member 39. In FIG. 1, the operating member 39 engages the projection $16_7$ and holds the housing 10 immovable. Current supply to the electromagnetic plunger 36 is controlled by actuation of a button switch 42. Upon such actuation, current is supplied from a current source 43 to the electromagnetic plunger 36, and the operating member 39 is withdrawn out of engagement with the projection $16_7$. On the other hand, actuation of the button 42 causes current supply to the coil 33 of the attracting device 30 from the current source 43 so that, as mentioned above, the device 30 loses the force for attracting the element 29 and accordingly the capstan arrangement 21 is returned. As a result, actuation of the button 42 causes the housing 10 to be released and, at the same time, the capstan arrangement 21 to be returned.

Upon returning of the capstan arrangement 21, the capstan 24 is urged against the rubber wheel 20 so that the rotation of the capstan 24 is transmitted through the rubber wheel 20 to the shaft 19. The rotation of the shaft 19 causes the released housing 10 to be rotated in the direction of arrow A. The housing 10 continues to be rotated while the button 42 is being actuated. When the button 42 is released, current supply to the electromagnetic plunger 36 is stopped so that operating member 39 is returned and engages one of the projections $16_1$, $16_2$, ..., $16_8$ of the housing 10. When the button 42 is momentarily actuated in the illustrated state, the projection $16_8$ will engage the operating member 39. Upon such engagement, the support 37 is swung counterclockwise by the swinging movement of the housing 10 and against the action of a spring 44 arranged between the support 37 and the player body so that the microswitch 41 is actuated by the support 37.

The microswitch 41 is connected between the current source 45 and the coil 32 of the attracting device 30, such connection establishing the current supply circuit of the coil 32. Closure of the microswitch 41 will cause a large current to be supplied from the current source 45 to the coil 32 so that the device 30 attracts the element 29 of the capstan arrangement 21. Attraction of the element 29 causes the capstan arrangement 21 to be swung counterclockwise so that the capstan 24 is moved off the rubber wheel 20, thus stopping the application of a force for rotating the housing 10. Upon such stoppage of the force for rotating the housing 10, the support 37 swings clockwise due to the action of the spring 44 until it is stopped by the stop pin 40. Upon such returning movement of the support 37, the microswitch 41 is deactuated so that the contact part (not shown) is opened. However, a resistor 46 is connected in parallel with the microswitch 41 so that a small current still continues to flow through the coil 34. Accordingly, the element 29 is still held in contact with the attracting device 80.

The above-mentioned current flow through the resistor 46 and the coil 34 is not large enough to produce flux which is sufficient to attract the element 29 separated from the cylindrical yoke 31 to swing the capstan arrangement 21 against the action of the spring 26. Thus, such current is just large enough to hold the element 29 in attracted state only when the magnetic path is closed by the element 29. Attraction of the capstan arrangement by the attracting device 30 causes the capstan 24 to abut against the pinch roller stored within the cartridge $11_8$ to thus effect tape running.

Referring to FIG. 3, the detail of the capstan arrangement 21 will be described hereinafter. Like parts are designated by like numerals of FIG. 1. The sideplates 27 and 28 of the deck 22 are rotatably supported by the shaft 23 and are swung in the direction of arrow B in operation of the attracting device 30 or in the direction of arrow C when returned by the spring. The deck 22 is provided with a cartridge guide 47 having outwardly tapered clamp pieces 48, 49 in opposition to each other. When the deck 22 is swung in the direction of arrow B, the leading edge portion of the selected cartridge is held between the pieces 48 and 49 of the cartridge guide 47 to define the relative position of the selected cartridge and the capstan 24 and thus to insure stable running operation of the tape and to keep the tape track in registration with the normal position. The cartridge guide is made of insulating material such as plastic, and between the pieces 48 and 49 there are provided two members 50 and 51 of electrically conductive material in the direction of the tape running, the two members being insulated from each other. The conductive members 50 and 51 are short-circuited by an end mark, such as an aluminum foil element, of the running tape, thus constituting an end-mark-detecting head.

A magnetic head 52 is mounted on the deck 22 through a support 53 of resilient material. Track selection is made through vertical shift of the position of the magnetic head 52, and this track-selecting operation is illustrated in FIG. 4. One end 54 of the head support 53 is fixed to the deck 22, while the other end 55 thereof abuts against a rotatable cam 56. To the rotatable shaft of the cam 56 there is fixed a ratchet wheel 57 which is engaged by a leaf spring member 60 connected at an end portion thereof to the operating member 59 of the electromagnetic plunger 58. Therefore, an actuation of the electromagnetic plunger 58 causes a 90° swing of the ratchet wheel 57. This results in rotation of the cam 56 and accordingly of the head support member 53 about the one end thereof 54, allowing vertical movement of the magnetic head 52. A circuit is so constituted that current is supplied from a current source 62 through said members 50 and 51 or a button switch 61 to the electromagnetic plunger 58. Thus, every time an end mark 64 of a tape 63 short-circuits the conductive members 50 and 51 the current source 62 is connected to the electromagnetic plunger 58 so that the cam 56 is advanced by a 90° step to permit vertical movement of the magnetic head 52. Four steps of such movement of the magnetic head 52 will result in four track changeover operations. One actuation of the button 61 can cause one-step track changeover operation.

The button switch 42 shown in FIG. 1 and the button 61 of FIG. 4 are arranged separately from the main body or player body of the arrangement, that is, on the front panel 66 of the control section 65 shown in FIG. 5. The front panel 66 of the control section 65 is also provided with cards $67_1$, $67_2$, ..., $67_8$ indicating the material to be played of the cartridges $11_1$, $11_2$, ..., $11_8$ in the housing 10 respectively. Each such card is releasably held in a card frame (not shown) to be replaced when the corresponding cartridge is replaced. Also arranged on the front panel 66 are four soundtrack-indicating windows $68_1$, $68_2$, $68_3$ and $68_4$. Such cartridge and track indication is carried out through illustration of corresponding parts by lamps arranged behind the front panel 66.

Figure 6A:
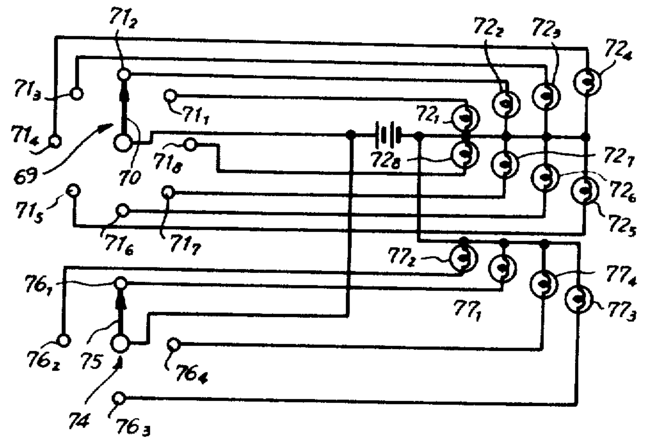

FIG. 6*a* is a circuit diagram of a system for the above-mentioned indication. A rotary switch 69 rotates in synchronism with the housing 10 of FIG. 1, and its rotating shaft is connected to the sleeve 13. The rotary switch 69 consists of one rotating contact 70 and light-fixed contacts $71_1$, $71_2$, ..., $71_8$; and the rotating contact 70 is successively brought into contact with the fixed contacts $71_1$, $71_2$, ..., $71_8$ as the housing 10 is rotated. When the cartridge $11_1$ is brought to the position opposite to the capstan arrangement 21 as the housing 10 is rotated, the lamp $72_1$ is connected to the current source 73 through the fixed contact $71_1$ and the rotary contact 70 and is lit. Thus, when the cartridge $11_1$ is selected, the lamp $72_1$ is lit and the card $67_1$ is illuminated, indicating to the user that sound reproduction is being made with respect to the cartridge $11_1$. In the same manner, sound reproduction with respect to other cartridges may be indicated through illumination of corresponding cards by corresponding lamps respectively. Thus, through actuation of the button 42, the user can select the desired cartridge and start the corresponding sound reproduction.

A rotary switch 74 is provided with the rotating shaft thereof common to that of the rotating or rotatable cam 56 of FIG. 4 and consists of a rotating contact 75 and four fixed contacts $76_1$, $76_2$, $76_3$ and $76_4$. When sound reproduction is made with respect to the first track, the current source 73 is connected through the rotating contact 75 and the fixed contact $76_1$ to the lamp $77_1$. Accordingly, the lamp $77_1$ is lit and illuminates the indicating window $68_1$, thus indicating that sound reproduction is being made with respect to the first track. Other track sound reproduction indication may be made in like manner through illumination of corresponding indicating windows by corresponding lamps respectively. Then, through actuation of the button 61, the user can perform track changeover operation and start sound reproduction with respect to the desired track. Also, when track switchover operation is automatically performed through the conductive members 50 and 51 and the end mark 64, the user can know the track with respect to which sound reproduction is being made.

Figure 6B:
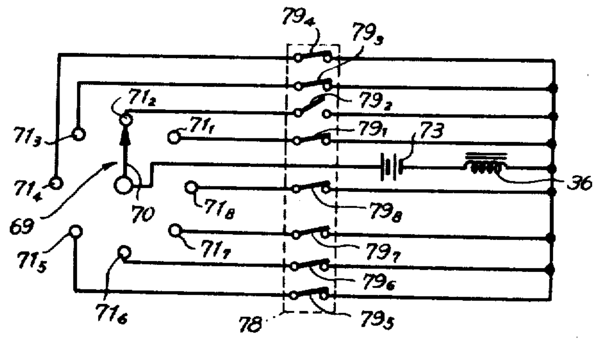

FIG. 6b shows another system for selecting a cartridge. Within a broken line enclosure 78 there are shown eight selecting button switches $79_1$, $79_2$, ..., $79_8$ corresponding to the cards $67_1$, $67_2$, ..., $67_8$ respectively. In the illustrated state, the button switch $79_2$ is actuated to be opened, while all other button switches remain closed. Accordingly, only when the rotating contact 70 of the rotary switch 69 is brought into contact with the fixed contact $71_2$, the electromagnetic plunger 36 (for engaging the housing 10 shown in FIG. 1) is not supplied with current so that the housing 10 is engaged and the cartridge $11_2$ is selected.

Now, when for example the button switch $79_8$ is actuated this only is opened and all other button switches remain closed so that current is supplied from the current source 73 to the electromagnetic plunger 36. Then, when the button switch 42 (FIG. 1) is actuated to supply a pulse current to the coil 33 of the attracting device 30, the housing 10 starts to rotate due to returning of the capstan arrangement 21. When the rotating housing 10 brings the rotating contact 70 into contact with the fixed contact $71_8$, current supply to the electromagnetic plunger 36 is stopped so that the housing 10 is engaged and the cartridge $11_8$ is selected. Since the button switch $79_8$ remains actuated, the material to be played can be known by the corresponding card $67_8$. Of course, in this case the button switch 42 must be deactuated in the circuit of the electromagnetic plunger 36 as shown in FIG. 1.

When the main body containing a plurality of such endless tape cartridges is held in the trunk of a car and the operating mechanism or control section is arranged at the dashboard, the user can readily carry out cartridge-selecting operation at the seat, a great practical advantage being thus provided.

While there has been described an example of the present invention in detail, it is to be understood that various modifications or alternatives may be made within the scope of the appended claims.

What I claim is:

1. An endless tape player comprising: a rotatable housing adapted to radially receive a plurality of endless tape cartridges in a manner that the leading edge thereof outwardly extends from said housing and having a plurality of lugs, each lug corresponding to an associated cartridge; drive means for said housing; a capstan arrangement including a capstan for abutting against a pinch roller stored within each said cartridge and a magnetic head for engaging an endless tape in a cartridge, said capstan arrangement being disposed on a swingable deck provided with drive means for rotating said capstan; a magnetic substance on said deck; cartridge-selecting means comprising one electromagnetic plunger having an actuator adapted to be moved into and out of the path of rotation of said lugs, whereby when said actuator engages a lug the rotation of said housing is arrested to bring one desired cartridge into a position where it faces said capstan arrangement; magnetically attractive means for magnetically attracting said magnetic substance and positioned such that attraction of said magnetic substance swings said deck and brings said capstan and said magnetic head in engagement with said pinch roller in the selected cartridge and the endless tape, respectively; an operating mechanism for controlling said cartridge-selecting means; means associated with said electromagnetic plunger for actuating the magnetically attractive means, said actuating means being operative in response to engagement of said lug and said actuator, said actuating means including an electric circuit for maintaining said magnetically attractive means in the operative state when rotation of said housing is arrested by said cartridge-selecting means; means for deactuating said magnetically attractive means responsive to and associated with said operating mechanism for said cartridge-selecting means, said deactuating means being operative in response to movement of said actuator out of engagement with said lug, and spring means disposed on said deck urging said capstan arrangement away from the selected endless tape cartridge, whereby when said magnetically attractive means is deactuated by said deactuation means the spring means moves the capstan arrangement away from the selected cartridge and the housing driving means rotates the housing.

2. An endless tape player comprising a rotatable housing adapted to radially receive a plurality of endless tape cartridges in a manner that the leading edge thereof outwardly extends from said housing and having a plurality of lugs, each lug corresponding to an associated cartridge; drive means for said housing; a capstan arrangement including a capstan for abutting against a pinch roller stored within each said cartridge and a magnetic head for engaging an endless tape in a cartridge, said capstan arrangement being disposed on a swingable deck provided with drive means for rotating said capstan; a magnetic substance on said deck; cartridge-selecting means comprising one electromagnetic plunger mounted on a swingable table and having an actuator adapted to be moved into and out of the path of rotation of said lugs, whereby when said actuator engages a lug the rotation of said housing is arrested to bring one desired cartridge into a position where it faces said capstan arrangement; magnetically attractive means for magnetically attracting said magnetic substance and positioned such that attraction of said magnetic substance swings said deck and brings said capstan and said magnetic head in engagement with said pinch roller in the selected cartridge and the endless tape, respectively; and operating mechanism for controlling said cartridge-selecting means including an electric circuit to energize said electromagnetic plunger and a switch; and spring means disposed on said deck urging said capstan arrangement away from the selected endless tape cartridge, said magnetically attractive means including a yoke, first and second exciting coils wound on said yoke, means for supplying a large electric current to said first exciting coil through a microswitch when the terminals of which are closed by said swingable table, the table being swung into contact with said terminals by the housing when the lug and actuator are engaged, means for supplying a small current to said first exciting coil through a resistor connected in parallel with said microswitch, said large current being sufficient to attract the capstan arrangement against the bias of said spring means, said capstan arrangement being maintained in an attractive state by said small current, and means for supplying electric current to said second coil sufficient to produce a flux cancelling the flux produced by the first exciting coil, said second coil current supply means being operative when current is supplied to the electromagnetic plunger by closing of the switch of said operating mechanism.

3. An endless tape player in accordance with claim 2 wherein said housing driving means comprises a rotatable shaft having a rotatable roller, said roller being positioned to be engaged by the capstan when the capstan arrangement is moved away from the housing by the spring means, the capstan imparting rotation to said roller to rotate said rotatable shaft, a belt wheel at the center of and connected to said housing; and a belt extending between said rotatable shaft and said belt wheel.

4. An endless tape player comprising a rotatable housing adapted to radially receive a plurality of endless tape cartridges in a manner that the leading edge thereof outwardly extends from said housing and having a plurality of lugs, each lug corresponding to an associated cartridge; drive means for said housing; a capstan arrangement including a capstan for abutting against a pinch roller stored within each said cartridge and a magnetic head for engaging an endless tape in a cartridge, said capstan arrangement being disposed on a swingable deck provided with drive means for rotating said capstan; a magnetic substance on said deck; cartridge-selecting means comprising one electromagnetic plunger having an actuator adapted to be moved into and out of the path of rotation of said lugs, whereby when said actuator engages a lug the rotation of said housing is arrested to bring one desired cartridge into a position where it faces to said capstan arrangement; magnetically attractive means for magnetically attracting said magnetic substance and positioned such that attraction of said magnetic substance swings said deck and brings said capstan and said magnetic head in engagement with said pinch roller in the selected cartridge and the endless tape, respectively; an operating mechanism for controlling said cartridge-selecting means; means associated with said electromagnetic plunger for actuating the magnetically attractive means when said lug and said actuator are engaged including an electric circuit for maintaining said magnetically attractive means in the operative state when rotation of said housing is arrested by said cartridge-selecting means; means for deactuating said magnetically attractive means responsive to and associated with said operating mechanism for said cartridge-selecting means, said deactuating means being operative when said actuator is moved out of engagement with said lug, spring means disposed on said deck urging said capstan arrangement away from the selected endless tape cartridge, whereby when said magnetically attractive means is deactuated the spring means moves the capstan arrangement away from the selected cartridge and the housing driving means rotates the housing; and track-selecting means for selecting a desired track of an endless tape comprising a support for said magnetic head, one end of said support being mounted on said deck and the other end being movable, an eccentric rotatable cam engageable with the lower edge of said other end of said support, a ratchet wheel journaled on the shaft of said rotatable cam, and ratchet wheel driving means having an actuator engageable with a tooth of said ratchet wheel for advancing said ratchet wheel tooth-by-tooth in response to electric current supplied to said ratchet wheel driving means, said operating mechanism including a track selection switch for controlling current to said ratchet wheel driving means, whereby a magnetic track is switched over by vertical movement of the magnetic head.

5. An endless tape player in accordance with claim 4 characterized in that said operating mechanism is provided with track indicators corresponding in number to the number of the track on the endless tape, and a plurality of lamps illuminating each of said track indicators, the selected cartridge being identified by illuminating said indicator when said lamp is selectively energized through a rotary switch rotatable synchronously with rotation of said cam.

6. An endless tape player in accordance with claim 5 wherein mounted to the deck of said capstan arrangement is an end-mark-detecting head consisting of a pair of conductive pieces and adapted to be energized by a tape end mark made of a conductive material, said detecting head being insulatively mounted to a cartridge guide having a pair of clamping pieces gripping the leading edge of the selected endless tape cartridge; said end-mark-detecting head being provided in parallel with said track selection switch incorporated in a ratchet wheel driving circuit, and self-changeover means for effecting switchover of a track automatically when said end mark is detected by said end-mark-detecting head.

7. An endless tape player comprising a rotatable housing adapted to radially receive a plurality of endless tape cartridges in a manner that the leading edge thereof outwardly extends from said housing and having a plurality of lugs, each lug corresponding to an associated cartridge; drive means for said housing; a capstan arrangement including a capstan for abutting against a pinch roller stored within each said cartridge and a magnetic head for engaging an endless tape in a cartridge, said capstan arrangement being disposed on a swingable deck provided with drive means for rotating said capstan; a magnetic substance on said deck; cartridge-selecting means comprising one electromagnetic plunger having an actuator adapted to be moved into and out of the path of rotation of said lugs, whereby when said actuator engages a lug the rotation of said housing is arrested to bring one desired cartridge into a position where it faces said capstan arrangement; magnetically attractive means for magnetically attracting said magnetic substance and positioned such that attraction of said magnetic substance swings said deck and brings said capstan and said magnetic head in engagement with said pinch roller in the selected cartridge and the endless tape, respectively; an operating mechanism for controlling said cartridge-selecting means; means associated with said electromagnetic plunger for actuating the magnetically attractive means, said actuating means being operative in response to engagement of said lug and said actuator, said actuating means including an electric circuit for maintaining said magnetically attractive means in the operative state when rotation of said housing is arrested by said cartridge-selecting means; means for deactuating said magnetically attractive means responsive to and associated with said operating mechanism for said cartridge-selecting means, said deactuating means being operative in response to movement of said actuator out of engagement with said lug, and spring means disposed on said deck urging said capstan arrangement away from the selected endless tape cartridge, whereby when said magnetically attractive means is deactuated by said deactuation means the spring means moves the capstan arrangement away from the selected cartridge and the housing driving means rotates the housing, said housing driving means including a rotatable shaft having a rotatable roller, said roller being positioned to be engaged by the capstan when the capstan arrangement is moved away from the housing by the spring means, the capstan imparting rotation to said roller to rotate said rotatable shaft, a belt wheel at the center of and connected to said housing, and a belt extending between said rotatable shaft and said belt wheel.

8. An endless tape player in accordance with claim 7 wherein said operating mechanism is arranged independently of a main player body having said housing, said capstan arrangement, said cartridge-selecting means, and said magnetically attractive means; said operating mechanism comprises a switch incorporated in a cartridge-selecting means circuit, a plurality of indicators capable of indicating a recorded content for each endless tape cartridge stored in said housing, and a plurality of lamps each illuminating each of said indicators; the selected cartridge being identified by illuminating said indicator when said lamp is selectively energized through a rotary switch rotatable synchronously with rotation of said housing.

9. An endless tape player in accordance with claim 8 wherein said magnetic plunger is mounted on a swingable table, said magnetically attractive means includes a yoke, a first exciting coil wound on said yoke, and a second exciting coil wound on said yoke; means for supplying a large electric current to said first exciting coil through a microswitch when the terminals of which are closed by said swingable table, the table being swung into contact with said terminals by the housing when the lug and actuator are engaged, means for supplying a small current to said first exciting coil through a resistor connected in parallel with said microswitch; said large current being sufficient to attract the capstan arrangement against the bias of said spring means; said capstan arrangement being maintained in an attractive state by said small current, and means for supplying electric current to the second exciting coil sufficient to produce a flux cancelling the flux produced by the first exciting coil, said second coil current supply means being operative when current is supplied to the electromagnetic plunger by closing of the switch of said operating mechanism.

10. An endless tape player in accordance with claim 8 wherein a magnetic head for said capstan arrangement is disposed on a support of which one end is secured to the deck and the other end is movable; track-selecting means is provided comprising an eccentric rotatable cam engageable with the lower edge of said other end of said support, a ratchet wheel journaled on the shaft of said rotatable cam, and ratchet wheel driving means having an actuator engageable with a tooth of said ratchet wheel for advancing said ratchet wheel tooth-by-tooth in response to electric current supplied to said ratchet wheel driving means, said operating mechanism including a track selection switch for controlling current to said ratchet wheel driving means, whereby a magnetic track is switched over by vertical movement of the magnetic head.

11. An endless tape player in accordance with claim 8 wherein said switch-controlling current to said endless tape cartridge-selecting means is a series of selectable one-by-one switches having terminals in number corresponding to the number of the endless tape cartridges stored in the housing, each terminal of said selectable one-by-one switches and said rotary switch being connected within said endless tape cartridge-selecting means, rotation of the housing being arrested in a position where one terminal of the operated selectable one-by-one switch is opened and the endless tape cartridge corresponding to each terminal faces said capstan arrangement.